(No Model.)

J. M. SCHOFIELD.
WOODEN LIQUID CONTAINING VESSEL.

No. 484,249. Patented Oct. 11, 1892.

Witnesses:

Inventor,
James M. Schofield
By Dewey & Co.
Attys.

UNITED STATES PATENT OFFICE.

JAMES M. SCHOFIELD, OF MERCED, CALIFORNIA, ASSIGNOR OF ONE-HALF TO E. S. O'BRIEN, OF SAME PLACE.

WOODEN LIQUID-CONTAINING VESSEL.

SPECIFICATION forming part of Letters Patent No. 484,249, dated October 11, 1892.

Application filed June 20, 1892. Serial No. 437,387. (No model.)

*To all whom it may concern:*

Be it known that I, JAMES M. SCHOFIELD, a citizen of the United States, residing at Merced, Merced county, State of California, have invented an Improvement in Wooden Liquid-Containing Vessels; and I hereby declare the following to be a full, clear, and exact description of the same.

My invention relates to the class of vessels made of separate sections, pieces, or staves of wood and designed to hold liquids—such vessels, for example, as casks, barrels, kegs, tanks, &c.

My invention consists in seating in the joints of said vessels pieces, strips, or strings of absorbent material; and its object is by keeping said material wet to introduce and maintain moisture in the joints to swell them and keep them tight, thus avoiding leakage by shrinkage.

Figure 1:
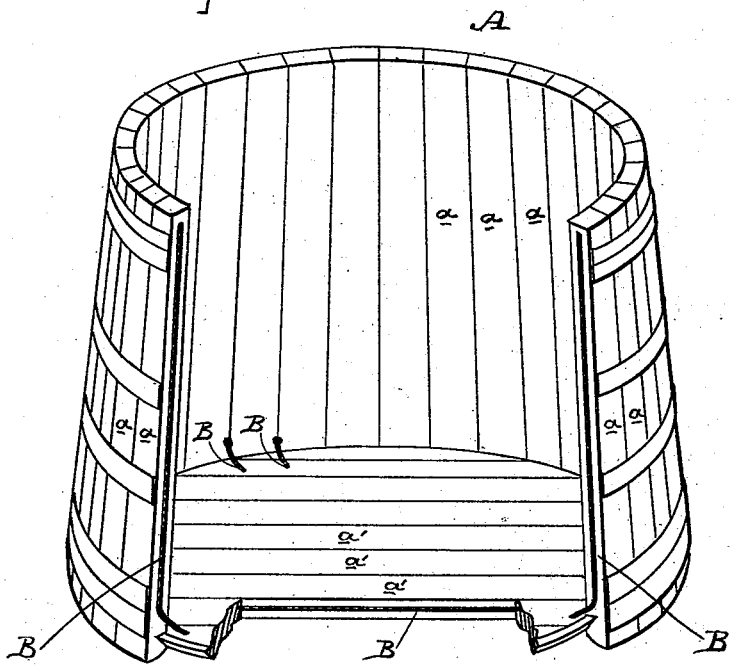
Figure 2:
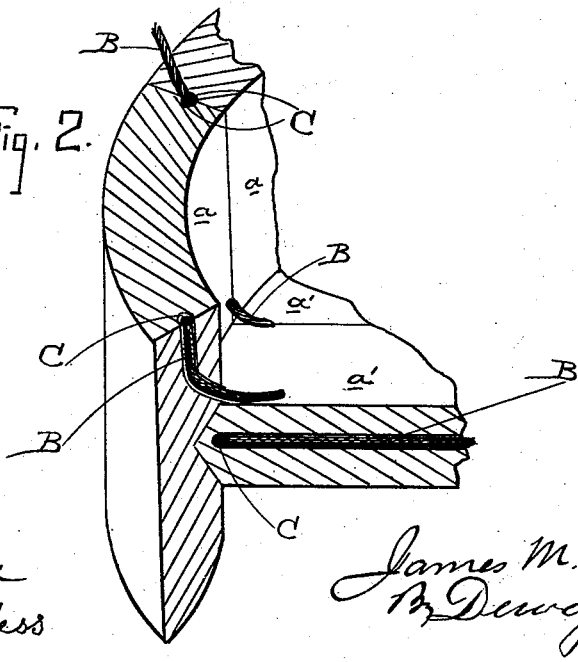

Referring to the accompanying drawings for a more complete explanation of my invention, Figure 1 is a perspective view of a liquid-containing vessel, a portion of the wall and bottom being removed or broken away to show my improvement applied thereto. Fig. 2 is a sectional part of said vessel, showing my improvement on a larger scale.

A is a vessel of any suitable shape made up of wooden pieces or staves, of which $a$ represents the staves of the sides, and $a'$ the pieces of the bottom or of the top or of either head of the vessel. Between these staves or pieces both of the sides and ends or heads—that is to say, in the joints of the vessel—are seated the pieces, strips, or strings B of absorbent material, such as cotton, wool, felt, or other fabric or material having absorbent and capillary properties. The liquid in the vessel entering the joints will keep these strips or strings wet, and they will retain enough moisture to swell said joints and keep them tight. This will result no matter how low the liquid may be, as the absorbent material extends the length of the joints, and being wet in one part will by capillary attraction become wet throughout. In seating this absorbent material grooves C are made in the adjacent edges of the vessel staves or pieces to receive said material, and thus the staves or pieces will fit closely to each other and make tight joints. The absorbent material may be fully inclosed in the joints or they may have their lower ends, as here shown, projecting inwardly into the vessel near its end, so that as long as any liquid remains in the vessel the absorbent material will be wet and will draw the liquid up throughout their length.

Having thus described my invention, what I claim as new, and desire to secure by Letters Patent, is—

1. A wooden vessel for containing liquid, formed of separate sections, pieces, or staves having grooves in their meeting edges and pieces, strips, or strings of absorbent material seated in said grooves, substantially as herein described.

2. A wooden vessel for containing liquid, formed of separate sections, pieces, or staves and having pieces, strips, or strings of absorbent material seated in its joints, said absorbent material projecting into the interior of the vessel, substantially as herein described.

3. A wooden vessel for containing liquid, formed of separate sections, pieces, or staves having grooves in their meeting edges and pieces, strips, or strings of absorbent material seated in said grooves and projecting into the interior of the vessel, substantially as herein described.

In witness whereof I have hereunto set my hand.

JAMES M. SCHOFIELD.

Witnesses:
W. C. TIGHE,
G. D. TOOKER.